(12) United States Patent
Bankoski et al.

(10) Patent No.: US 10,165,306 B2
(45) Date of Patent: *Dec. 25, 2018

(54) SYSTEM AND METHOD FOR VIDEO ENCODING USING CONSTRUCTED REFERENCE FRAME

(71) Applicant: Google Inc., Mountain View, CA (US)

(72) Inventors: James Bankoski, Los Gatos, CA (US); Yaowu Xu, Saratoga, CA (US); Paul Wilkins, Cambridge (GB)

(73) Assignee: GOOGLE LLC, Mountain View, CA (US)

(*) Notice: Subject to any disclaimer, the term of this patent is extended or adjusted under 35 U.S.C. 154(b) by 43 days.

This patent is subject to a terminal disclaimer.

(21) Appl. No.: 15/186,800

(22) Filed: Jun. 20, 2016

(65) Prior Publication Data

US 2016/0309192 A1  Oct. 20, 2016

Related U.S. Application Data

(63) Continuation of application No. 13/658,396, filed on Oct. 23, 2012, now Pat. No. 9,374,596, which is a
(Continued)

(51) Int. Cl.
*H04B 1/66* (2006.01)
*H04N 7/12* (2006.01)
(Continued)

(52) U.S. Cl.
CPC ........... *H04N 19/80* (2014.11); *H04N 19/105* (2014.11); *H04N 19/107* (2014.11);
(Continued)

(58) Field of Classification Search
CPC .. H04N 19/105; H04N 19/139; H04N 19/176; H04N 19/172; H04N 19/61;
(Continued)

(56) References Cited

U.S. PATENT DOCUMENTS 5,828,848 A * 10/1998 MacCormack ... G06F 17/30017
  348/E5.099
6,178,205 B1 * 1/2001 Cheung .................. H04N 5/145
  348/E5.066

(Continued)

OTHER PUBLICATIONS

Shen, L., et al, 'Fast mode decision for multiview video coding', 2009, IEEE, entire document, http://ieeexplore.ieee.org/stamp/stamp.jsp?arnumber=5413552.*

(Continued)

*Primary Examiner* — Luu T Pham
*Assistant Examiner* — Ronald Baum
(74) *Attorney, Agent, or Firm* — Young Basile Hanlon & MacFarlane, P.C.

(57) ABSTRACT

Decoding an encoded video stream may include generating, by a processor in response to instructions stored on a non-transitory computer readable medium, a decoded video for presentation to a user, and outputting the decoded video. Generating the decoded video may include receiving an encoded video stream, generating a decoded constructed reference frame by decoding an encoded constructed reference frame from the encoded video stream, generating a decoded current frame by decoding an encoded current frame from the encoded video stream using the decoded constructed reference frame as a reference frame, and including the decoded current frame in the decoded video such that the decoded constructed reference frame is omitted from the decoded video.

24 Claims, 8 Drawing Sheets

Related U.S. Application Data continuation of application No. 12/329,041, filed on Dec. 5, 2008, now Pat. No. 8,385,404.

(60) Provisional application No. 61/096,189, filed on Sep. 11, 2008.

(51) Int. Cl.

| | | |
|---|---|---|
| *H04N 19/80* | (2014.01) | |
| *H04N 19/105* | (2014.01) | |
| *H04N 19/139* | (2014.01) | |
| *H04N 19/176* | (2014.01) | |
| *H04N 19/172* | (2014.01) | |
| *H04N 19/61* | (2014.01) | |
| *H04N 19/107* | (2014.01) | |
| *H04N 19/117* | (2014.01) | |
| *H04N 19/127* | (2014.01) | |
| *H04N 19/179* | (2014.01) | |
| *H04N 19/23* | (2014.01) | |
| *H04N 19/527* | (2014.01) | |

(52) U.S. Cl.
CPC ......... *H04N 19/117* (2014.11); *H04N 19/127* (2014.11); *H04N 19/139* (2014.11); *H04N 19/172* (2014.11); *H04N 19/176* (2014.11); *H04N 19/179* (2014.11); *H04N 19/23* (2014.11); *H04N 19/527* (2014.11); *H04N 19/61* (2014.11)

(58) Field of Classification Search
CPC .. H04N 19/527; H04N 19/117; H04N 19/127; H04N 19/179; H04N 19/80; H04N 19/23; H04N 19/107
USPC ..................................... 375/240.01
See application file for complete search history.

(56) References Cited

U.S. PATENT DOCUMENTS

| | | | | |
|---|---|---|---|---|
| 6,895,051 | B2 * | 5/2005 | Nieweglowski | H04N 19/51 375/240 |
| 7,177,360 | B2 * | 2/2007 | Koto | H04N 19/176 375/240 |
| 7,515,637 | B2 * | 4/2009 | Payson | H04N 19/176 375/240 |
| 7,734,821 | B2 * | 6/2010 | Wang | G10L 19/005 348/387.1 |
| 2004/0036782 | A1 * | 2/2004 | Knapp | G06T 7/20 348/239 |
| 2005/0259736 | A1 * | 11/2005 | Payson | H04N 19/176 375/240.16 |
| 2006/0083300 | A1 * | 4/2006 | Han | H04N 19/70 375/240.03 |
| 2007/0073779 | A1 * | 3/2007 | Walker | H04N 21/23439 |
| 2008/0130988 | A1 * | 6/2008 | Moriya | H04N 19/176 382/166 |
| 2008/0247463 | A1 * | 10/2008 | Buttimer | H04N 19/105 375/240.12 |
| 2009/0148058 | A1 * | 6/2009 | Dane | H04N 5/145 382/251 |
| 2009/0323809 | A1 * | 12/2009 | Raveendran | H04N 19/46 375/240.16 |

OTHER PUBLICATIONS

Yang, H., et al, 'Optimizing Motion Compensated Prediction for Error Resilient Video Coding', IEEE Transactions on Image Processing, vol. 19, No. 1, Jan. 2010, entire document, https://scl.ece.ucsb.edu/sites/scl.ece.ucsb.edu/files/publications/a10_1_0.pdf.*

* cited by examiner

SYSTEM AND METHOD FOR VIDEO ENCODING USING CONSTRUCTED REFERENCE FRAME

CROSS-REFERENCE TO RELATED APPLICATIONS

This application is a continuation of U.S. patent application Ser. No. 13/658,396, filed Oct. 23, 2012, now U.S. Pat. No. 9,347,569, which claims priority to U.S. patent application Ser. No. 12/329,041, filed Dec. 5, 2008, which claims priority to U.S. provisional patent application No. 61/096,189, filed Sep. 11, 2008, which is incorporated herein in its entirety by reference.

TECHNICAL FIELD

The present invention relates in general to video encoding and decoding.

BACKGROUND

An increasing number of applications today make use of digital video for various purposes including, for example, remote business meetings via video conferencing, high definition video entertainment, video advertisements, and sharing of user-generated videos. As technology is evolving, people have higher expectations for video quality and expect high resolution video even when transmitted over communications channels having limited bandwidth.

To permit higher quality transmission of video while limiting bandwidth consumption, a number of video compression schemes are noted including proprietary formats such as VPx (promulgated by On2 Technologies, Inc. of Clifton Park, N.Y.) and H.264, standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

These compression schemes may use prediction techniques to minimize the amount of data required to transmit video information. Prediction techniques can allow for multiple past transmitted frames and future frames to be transmitted out of order and used as a potential reference frame predictors for macroblocks in a frame. For example, video compression schemes, such as the MPEG or H.264 standard allow for transmission of frames out of order and use them to produce better predictors by use of forward or bidirectional prediction. Further, for example, the H.264 video compression standard allows for multiple past reference frames to be used as a predictor.

SUMMARY

Disclosed herein are systems, methods, and apparatus for video decoding using constructed reference frame.

An aspect of the disclosed embodiments is a method of decoding an encoded video stream. Decoding an encoded video stream may include generating, by a processor in response to instructions stored on a non-transitory computer readable medium, a decoded video for presentation to a user, and outputting the decoded video. Generating the decoded video may include receiving an encoded video stream, generating a decoded constructed reference frame by decoding an encoded constructed reference frame from the encoded video stream, generating a decoded current frame by decoding an encoded current frame from the encoded video stream using the decoded constructed reference frame as a reference frame, and including the decoded current frame in the decoded video such that the decoded constructed reference frame is omitted from the decoded video.

Another aspect of the disclosed embodiments is a non-transitory computer-readable storage medium, comprising executable instructions that, when executed by a processor, facilitate performance of operations, including generating a decoded video for presentation to a user, and outputting the decoded video. Generating the decoded video may include receiving an encoded video stream, generating a decoded constructed reference frame by decoding an encoded constructed reference frame from the encoded video stream, generating a decoded current frame by decoding an encoded current frame from the encoded video stream using the decoded constructed reference frame as a reference frame, and including the decoded current frame in the decoded video such that the decoded constructed reference frame is omitted from the decoded video.

Another aspect of the disclosed embodiments is a method of decoding an encoded video stream. Decoding an encoded video stream may include generating, by a processor in response to instructions stored on a non-transitory computer readable medium, a decoded video, and outputting the decoded video. Generating the decoded video may include generating a decoded current frame by decoding an encoded current frame from an encoded video stream using a constructed reference frame as a reference frame, and including the decoded current frame in the decoded video such that the constructed reference frame is omitted from the decoded video.

These and other embodiments of the invention, including methods of extracting a constructed reference frame from a series of digital video frames, are described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
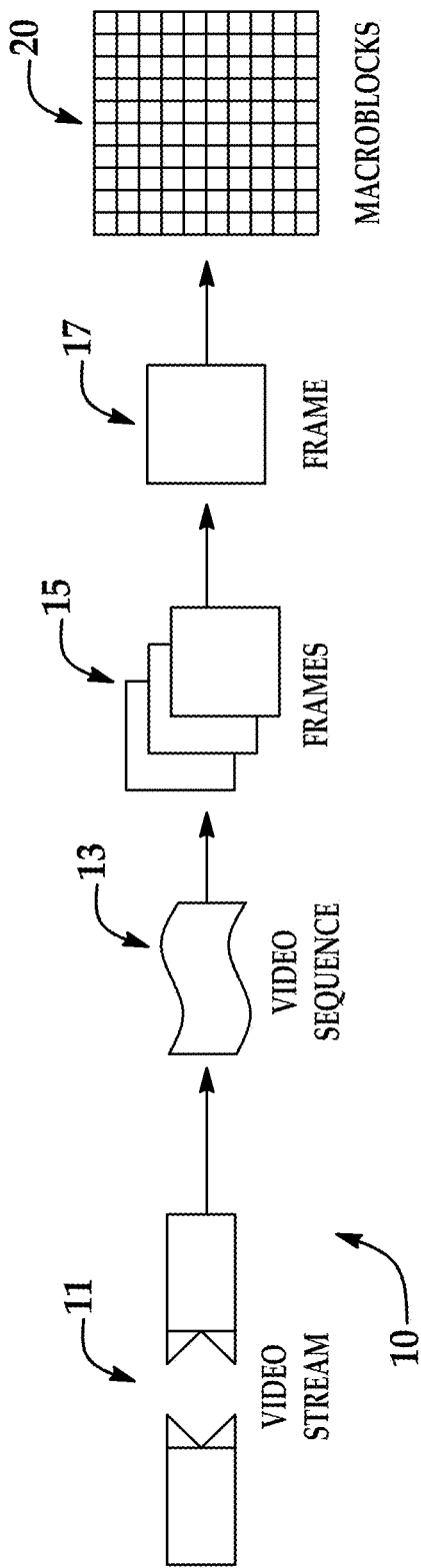
FIG. 1 is a diagram of the hierarchy of layers in a video compression bitstream.

Referring to FIG. 1, video coding formats, such as VP8 or H.264, provide a defined hierarchy of layers for a video stream 11. The highest level in the layer is a video sequence 13. At the next level, video sequence 13 consists of a number of adjacent frames 15, which can be further subdivided into a single frame 17. At the next level, frame 17 is composed of a series of fixed-size macroblocks 20, which contain compressed data corresponding to, for example, a 16×16 block of displayed pixels in frame 17. Each macroblock contains luminance and chrominance data for the corresponding pixels. Macroblocks 20 can also be of any other suitable size such as 16×8 pixel groups or 8×16 pixel groups. Macroblocks 20 are further subdivided into blocks. A block, for example, is a 4×4 pixel group that can further describe the luminance and chrominance data for the corresponding pixels. Blocks can also be of any other suitable size such as 8×8, 8×4 and 4×8 pixels.

Figure 2:
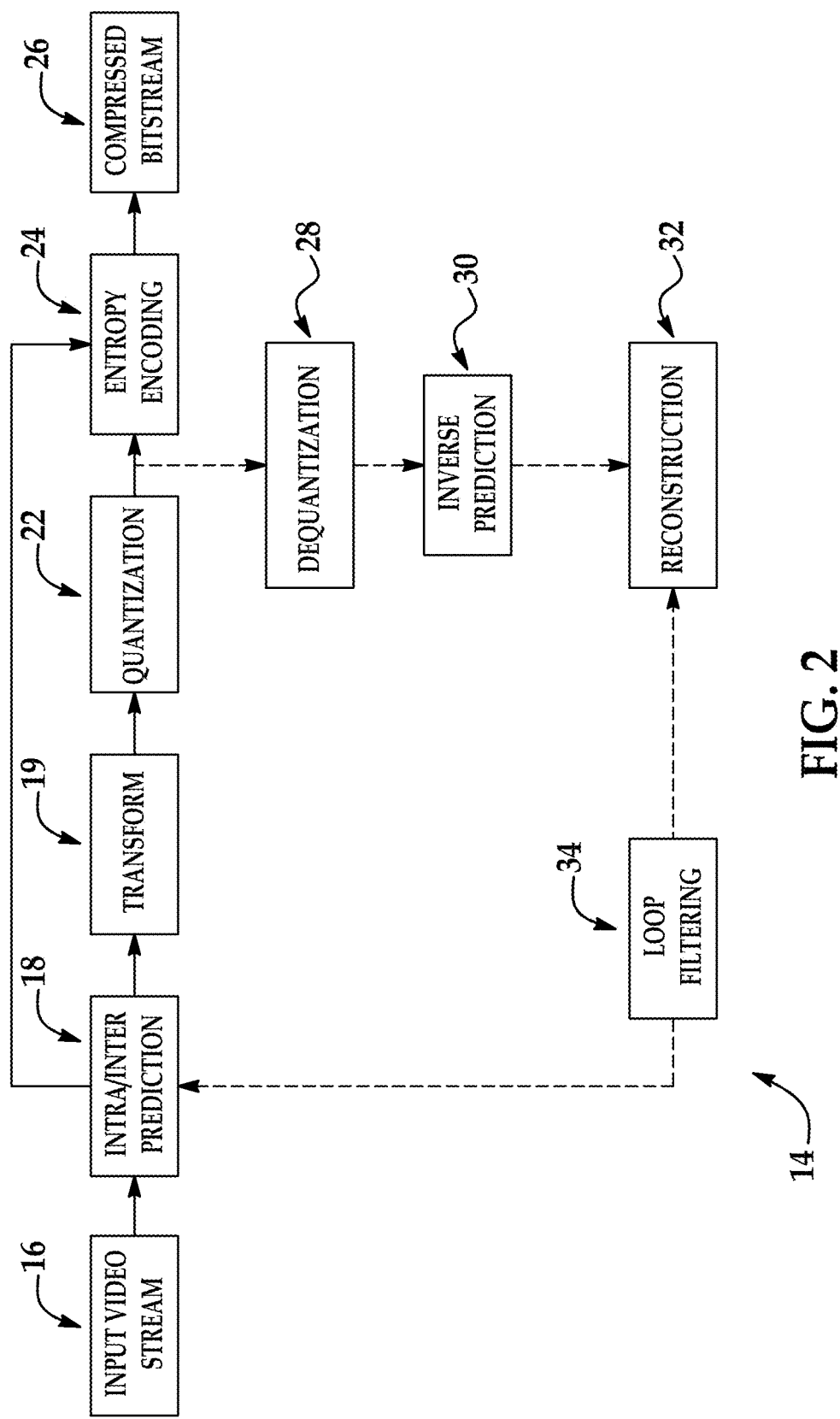
FIG. 2 is a block diagram of encoding and reconstructing video data in accordance with an embodiment of the invention.

Referring to FIG. 2, in accordance with one embodiment, to encode an input video stream 16, an encoder 14 performs the following functions in a forward path (shown by the solid connection lines) to produce an encoded bitstream 26: intra/inter prediction 18, transform 19, quantization 22 and entropy encoding 24. Encoder 14 also includes a reconstruction path (shown by the dotted connection lines) to reconstruct a frame for encoding of further macroblocks. Encoder 14 performs the following functions in the reconstruction path: dequantization 28, inverse transform 30, reconstruction 32 and loop filtering 34. Other structural variations of encoder 14 can be used to encode bitstream 26.

When input video stream 16 is presented for encoding, each frame 17 within input video stream 16 is processed in units of macroblocks. At intra/inter prediction stage 18, each macroblock is encoded using either intra prediction or inter prediction mode. In either case, a prediction macroblock can be formed based on a reconstructed frame. In the case of intra-prediction, a prediction macroblock is formed from samples in the current frame that have been previously encoded and reconstructed. In the case of inter-prediction, a prediction macroblock is formed from one or more constructed reference frames as described in additional detail herein.

Next, still referring to FIG. 2, the prediction macroblock is subtracted from the current macroblock to produce a residual macroblock (residual). Transform stage 19 transform codes the residual, and quantization stage 22 quantizes the residual to provide a set of quantized transform coefficients. The quantized transform coefficients are then entropy coded by entropy encoding stage 24. The entropy-coded coefficients, together with the information required to decode the macroblock, such as the type of prediction mode used, motion vectors and quantizer value, are output to compressed bitstream 26.

The reconstruction path in FIG. 2 is present to ensure that both the encoder and the decoder use the same reference frames required to decode the macroblocks. The reconstruction path, similar to functions that take place during the decoding process that are discussed in more detail below, includes dequantizing the transformed coefficients by dequantization stage 28 and inverse transforming the coefficients by inverse transform stage 30 to produce a derivative residual macroblock (derivative residual). At the reconstruction stage 32, the prediction macroblock is added to the derivative residual to create a reconstructed macroblock. A loop filter 34 is applied to the reconstructed macroblock to reduce blocking distortion.

Figure 3:
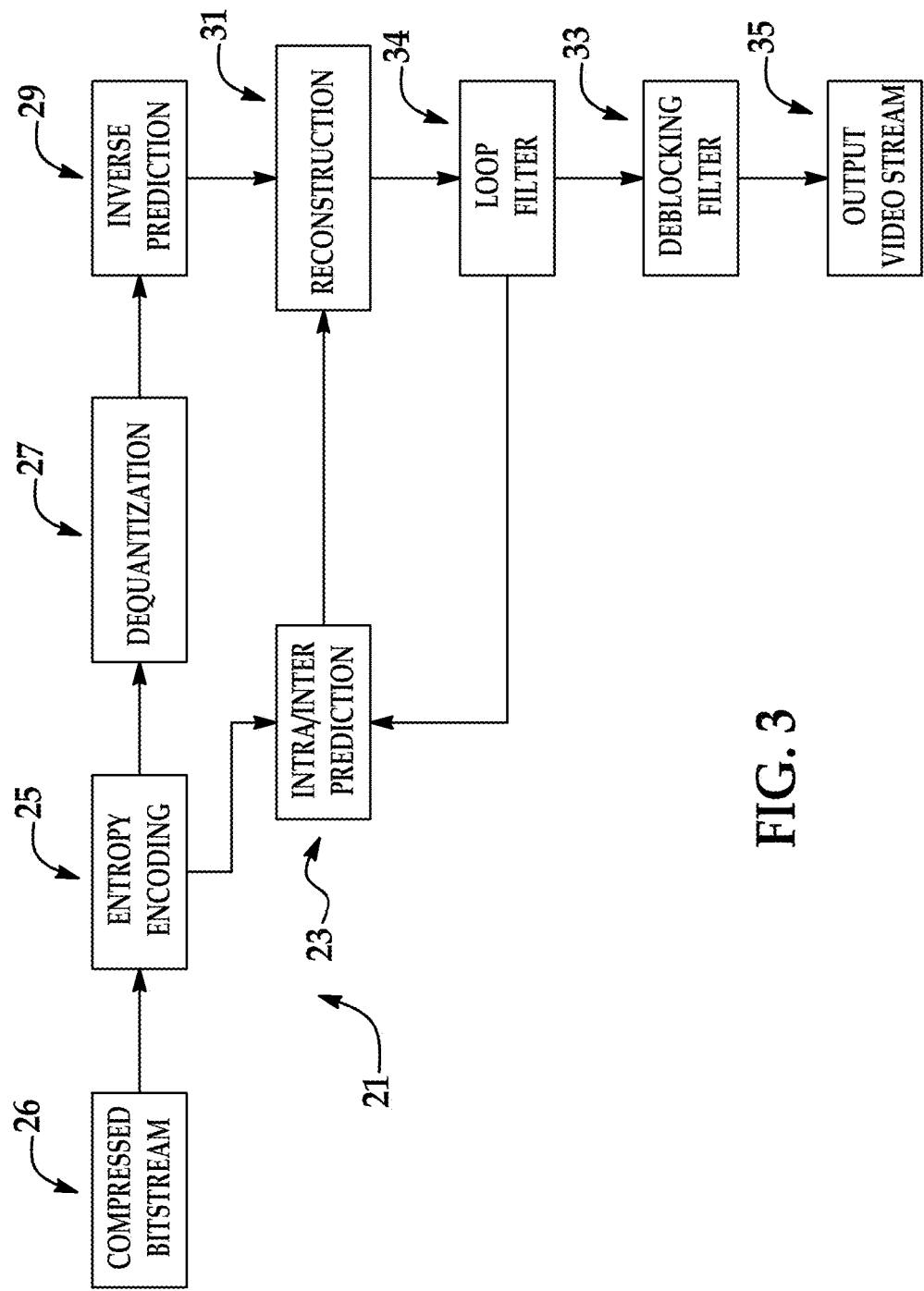
FIG. 3 is a block diagram of a video decompression system in accordance with an embodiment of the invention.

Referring to FIG. 3, in accordance with one embodiment, to decode compressed bitstream 26, a decoder 21, similar to the reconstruction path of the encoder 14 discussed previously, performs the following functions to produce an output video stream 35: entropy decoding 25, dequantization 27, inverse transform 29, intra/inter prediction 23, reconstruction 31, loop filter 34 and deblocking filtering 33. Other structural variations of decoder 21 can be used to decode compressed bitstream 26.

When compressed bitstream 26 is presented for decoding, the data elements can be entropy decoded by entropy decoding stage 25 (using for, for example, Context Adaptive Binary Arithmetic Coding) to produce a set of quantized coefficients. Dequantization stage 27 dequantizes the coefficients, and inverse transform stage 29 inverse transforms the coefficients to produce a derivative residual that is identical to that created by the reconstruction stage in the encoder 14. Using header information decoded from the compressed bitstream 26, at intra/inter prediction stage 23, decoder 21 creates the same prediction macroblock as was created in encoder 14. At the reconstruction stage 31, the prediction macroblock is added to the derivative residual to create a reconstructed macroblock. The loop filter 34 can be applied to the reconstructed macroblock to further reduce blocking artifacts. A deblocking filter 33 is applied to the reconstructed macroblock to reduce blocking distortion, and the result is output as output video stream 35.

Referring again to encoder 14, video encoding methods compress video signals by using lossless or lossy compression algorithms to compress each frame or blocks of each frame of a series of frames. As can be implied from the description above, intra-frame coding refers to encoding a frame using data from that frame, while inter-frame coding refers to predictive encoding schemes such as schemes that comprise encoding a frame based on other so-called "reference" frames. For example, video signals often exhibit temporal redundancy in which frames near each other in the temporal sequence of frames have at least portions that match or at least partially match each other. Encoders can take advantage of this temporal redundancy to reduce the size of encoded data by encoding a frame in terms of the difference between the current frame and one or more reference frames.

Video encoders may use motion compensation based algorithms that match blocks of the frame being encoded to portions of one or more other frames. The block of the encoded frame may be shifted in the frame relative to the matching portion of the reference frame. This shift is characterized by a motion vector. Any differences between the block and partially matching portion of the reference frame may be characterized in terms of a residual. The encoder 14 may thus encode a frame as data that comprises one or more of the motion vectors and residuals for a particular partitioning of the frame. A particular partition of blocks for encoding the frame may be selected by approximately minimizing a cost function that, for example, balances encoding size with distortion to the content of the frame resulting from encoding.

As described briefly above, many video coding algorithms first partition each picture into macroblocks. Then, each macroblock is coded using some form of predictive coding method such as motion compensation. Some video coding standards use different types of predicted macroblocks in their coding. In one scenario, a macroblock may be one of three types: 1) Intra (I) macroblock that uses no information from other pictures in its coding; 2) Unidirectionally Predicted (P) macroblock that uses information from one preceding picture; and 3) Bidirectionally Predicted (B) macroblock that uses information from one preceding picture and one future picture.

To facilitate higher quality compressed video, it is helpful to have the best matching reference frame in order to have the smallest difference to encode, which generally results in a more compact encoding. Currently, reference frames are based on past frames, future frames, or an intra-frame so that the encoder can find the best matching block to use in the predictive process as shown in, for example, U.S. Application Publication No. 2005/0286629. However, reference frames currently used are based on real frames that are shown to the end-user.

This results in several problems, the main one being that such reference frames do not provide the highest-quality reference data and can result in lower quality video compression.

In contrast, the reference frame created and used by the encoder 14 described herein is a constructed reference frame, which is a frame of image data that is encoded into the bitstream and serves to improve the encoding of subsequently transmitted frames. Unlike a conventional reference frame, a constructed reference frame is not shown to the user. Due to the flexibility of the techniques described herein, a constructed reference frame may not even have the same dimensions as the video stream's raw image frames or the frames displayed to the user. Instead, the constructed reference frame serves as a predictor, giving subsequent frames a better predictive choice than a prior transmitted frame might offer. The creation of a constructed reference frame is not defined by the bitstream. Instead, creating the best possible constructed reference frame is a task left to the encoder. In this way, the computational expense of constructing a reference frame is done by the encoder rather than the decoder.

An embodiment of the present invention uses one or more constructed reference frame buffers as a predictor for pieces of the current frame data. This includes the usage of these frame buffers for motion compensated and non motion compensated prediction. It also covers the usage of combination of a constructed reference frame with a real reference frame for prediction as in typical bidirectional prediction modes.

Generally, the constructed reference frame can be built by a number of methods and used in a variety of ways for encoding. Methods for building the constructed reference frame are first generally described below before specific examples are described.

According to a first method of creating the constructed reference frame, a copy of an existing frame is encoded into the bitstream some time before that frame would normally appear in a sequence of image frames. A relevant parameter to the encoding herein is the quality of the encoding of the reference frame or "boost." The more reliable the constructed reference frame is, the more valuable precise encoding of that frame can be. Conversely, a reference frame of limited predictive value need not be encoded to a very high level of precision. In this first method, the copy of this frame is usually, but not necessarily encoded at a somewhat higher than average quality.

Other frames are encoded according to conventional techniques using this constructed reference frame. When the target frame used to encode the constructed reference frame is encountered in the bitstream, it would be encoded with reference to the copy of the existing frame, that is, the constructed reference frame. Such encoding would occur, for example, with a lower quality level or lower boost than that used to encode the constructed reference frame.

Figure 4:
FIG. 4 is a pictorial representation of a constructed reference frame in accordance with an embodiment of the invention.
Figure 4:

Another method of creating a constructed reference frame generally includes selecting the target frame as above and using temporal filtering to remove video noise from several source frames centered on that target frame. Such a constructed reference frame is shown in FIG. 4. The temporal filtering can be applied by the encoder by using, for example, a motion-compensated threshold blur filter such as described in U.S. Pat. No. 6,178,205, which is incorporated herein in its entirety by reference. Removal of the video noise that differs from frame to frame makes the constructed reference frame a better predictor for multiple frames, increasing data compression of the video stream.

Figure 5:
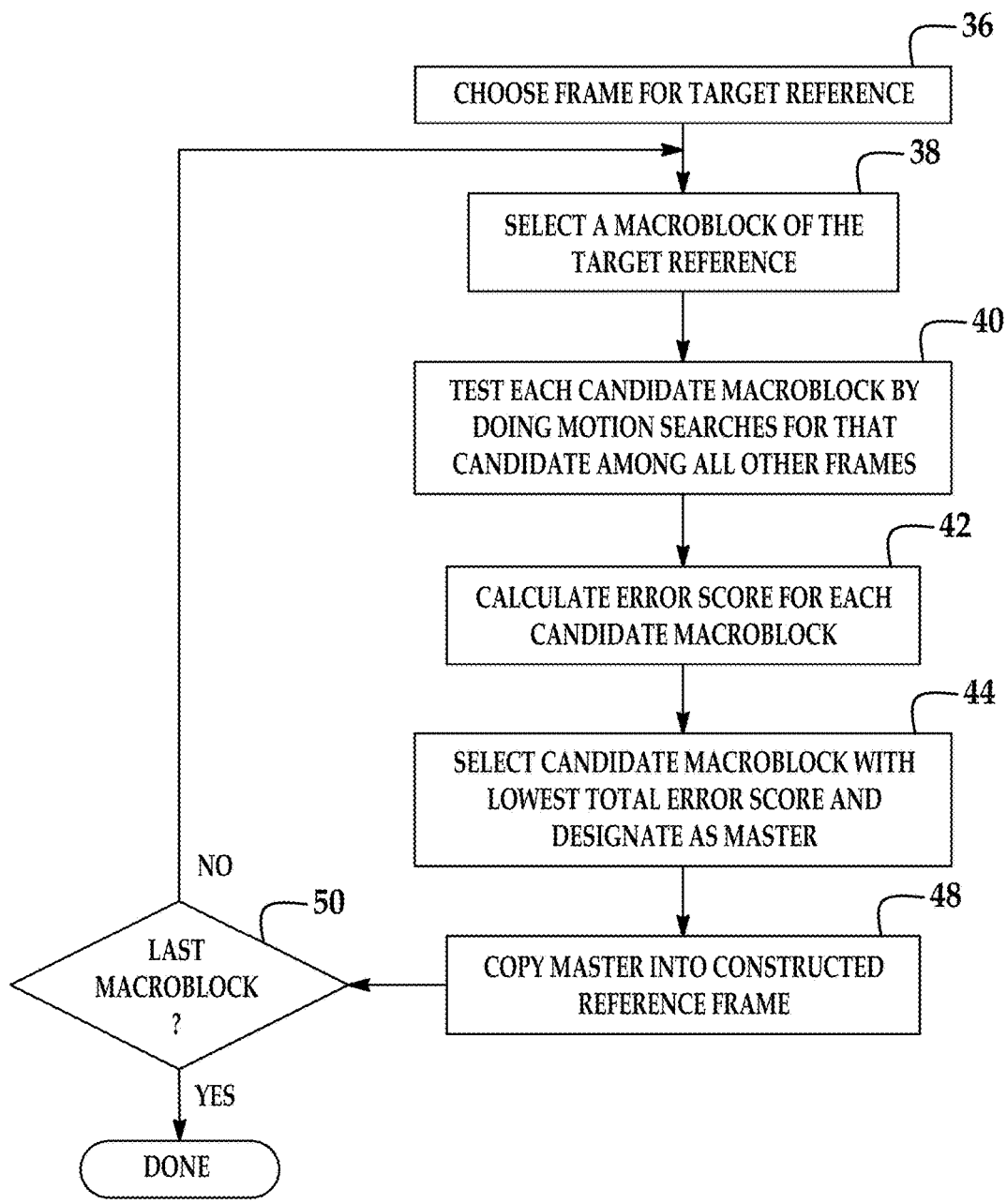
FIG. 5 is a flow chart illustrating an exemplary method of assembling a constructed reference frame in accordance with an embodiment of the invention.

A further possible embodiment is shown with reference to FIG. 5. First, a frame is picked as a target reference in step 36. Then, for each macroblock in that frame, the following steps are performed. In step 38, a macroblock for the frame is chosen, and then the best matching macroblock for that frame is found from several candidate frames. Namely, in step 40, each candidate macroblock from several candidate frames is tested by doing motion searches for the chosen macroblock among all the other frames. That is, a candidate macroblock is identified from each of the several candidate frames that is the most similar to the macroblock selected in the target reference frame. For example, if a nose exists in the selected macroblock in the target reference frame, macroblocks containing similar image characteristics would be selected from the candidate frames. In step 42, the error score is calculated for each candidate macroblock. The error score measures the sum total of the difference between the candidate macroblock and all of the other candidate macroblocks. The candidate macroblock with the lowest total error score is selected as the master in step 44. The master is copied into a constructed reference frame in step 46. Since steps 38 to 48 are performed for each macroblock of the target reference frame, after step 48, step 50 asks whether there are any remaining macroblocks. If no, the process ends. Otherwise, the process returns to step 38 to repeat steps 38 to 48 for the next macroblock of the target reference frame. Although this method is described with reference to macroblocks, any sized block of pixels could be used.

A third method of creating a constructed reference frame is to create only a high quality background frame for encoding using background extraction and/or motion segmentation. Various techniques for background extraction and motion segmentation are known in the art. Generally, any block that has a high motion vector (i.e., is moving fast) is considered foreground and is not copied into the constructed reference frame. Any block that has a (0,0) motion vector or other low motion vector (i.e., is moving slowly) is considered background and is copied into the constructed reference frame.

Of course, although this method describes creating only a high quality background frame, there is no limit in theory to the number of constructed frames encoded. Accordingly, it is also possible to segment the foreground and background into separate constructed reference frames.

Although not previously mentioned, in order to facilitate usage of the reference frames in the described manner, encoding of an alpha channel for use in constructed reference frames may be desirable.

Another method of creating the constructed reference frame is to use image super resolution to construct a frame of a different size than the target frame. There is no requirement that the reference frame exactly matches the size and dimensions of the actual video being encoded. For example, in a zoom out, pan or rotate, a larger area is slowly revealed over several frames. A constructed reference frame that is larger than the original frame provides higher quality prediction for the border areas.

Figure 6:
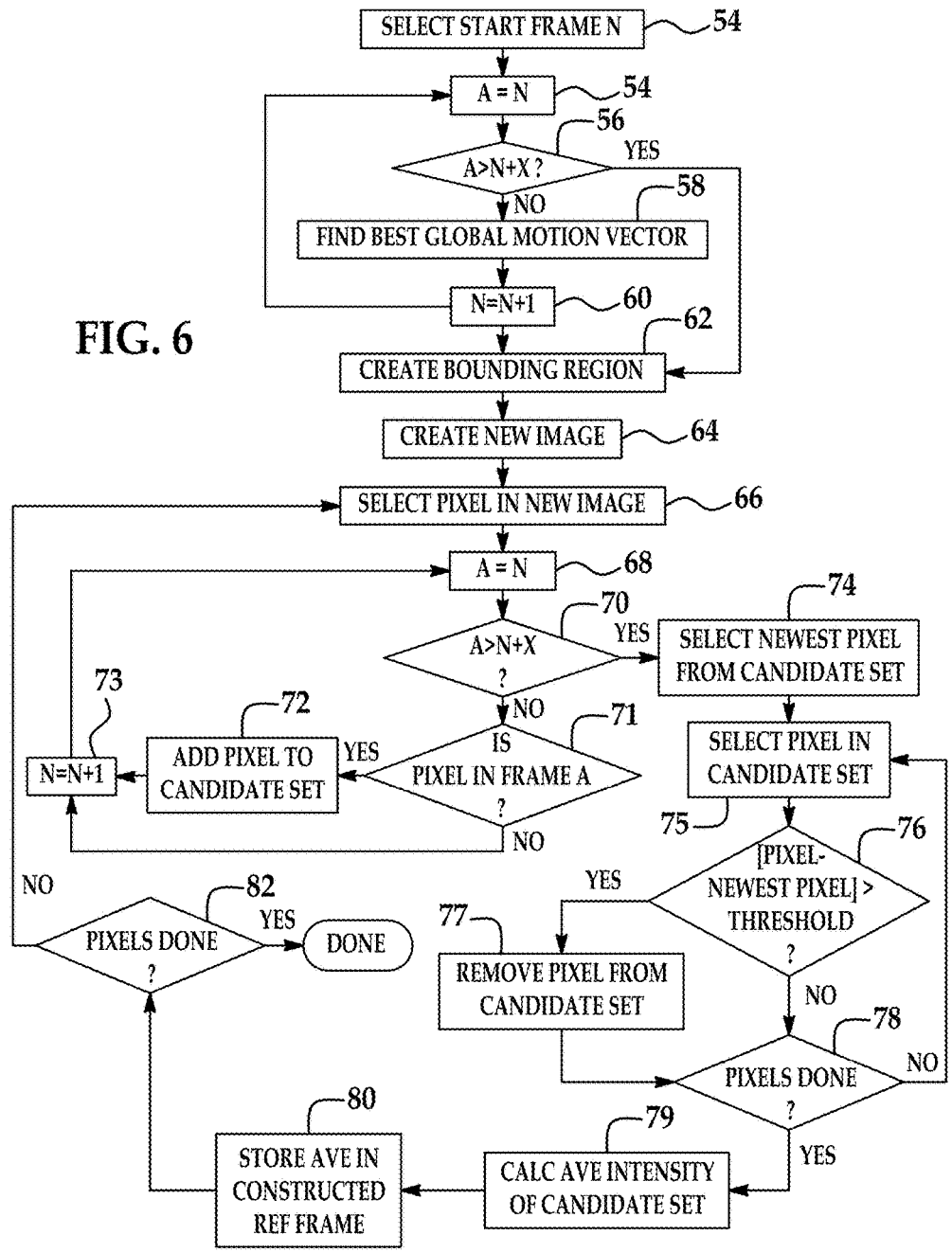
FIG. 6 is a flow chart illustrating an exemplary method of assembling a constructed reference frame in accordance with an embodiment of the invention.

One method of creating such a constructed reference frame is shown by example in FIG. 6. In first step 52, a start frame N is selected. In step 54, a number of steps are started for each frame A from start frame N to frame N+X, where X is an integer. Specifically, in step 54, the frame A is set to the start frame N, and in step 56, the encoder 14 checks whether the number of frame A is greater than N+X number of frames. If not, the encoder 14 finds the best global motion vector that matches current frame A to start frame N in step 58. The best global motion vector can be found by any global motion vector search method such as full search or diamond search. Such methods are described in, for example, Dane et al., "Efficient Motion Accuracy Search for Global Motion Vector Coding," Fortieth Asilomar Conference on Signals, Systems and Computers, ACSSC '06, October-November 2006, pp. 1072-1075.

After step 58, the frame is incremented at step 60, and the new frame becomes current frame A in step 54. Steps 56, 58 and 60 are repeated until the number of current frame A is greater than N+X number of frames as indicated by step 56. Then, processing advances to step 62, where a bounding region is created that covers the entire set of frames when aligned on top of each other by use of the global motion vector. In next step 64, a new image is created that is larger in dimensions that the source frames. Preferably, the new image is large enough to cover the entire region as it is moved about.

After finding the global motion vectors and creating a new image that completely bounds the set of video frames in step 64, the remaining steps are performed for each pixel in the new image. Namely, in step 66 a pixel in the new image is selected. In step 68, the frame A is again set to the start frame N so that the following steps are performed for each frame A from start frame N to frame N+X. First, in step 70, the encoder 14 checks whether the number of frame A is greater than N+X number of frames. If not, the encoder 14 queries in step 71 whether the selected pixel is in current frame A. If the selected pixel is in current frame A in step 71, processing advances to step 72, where the encoder 14 adds the pixel to a candidate set. Processing then advances to step 73, where the frame is incremented. If the selected pixel is not in current frame A in step 71, processing advances directly to step 73 to increment the frame. Then, the frame as incremented is set as current frame A in step 68, and the selected pixel is searched for in the new frame in step 71. This process is completed for each frame of the set of frames to form the candidate set. Once all of the frames have been checked for the selected pixel (as indicated by a yes response to the query in step 70), processing advances to step 74, where a number of steps are performed for the candidate set.

Namely, in step 74, the newest pixel is selected from the candidate set, and each remaining pixel of the candidate set is compared to that newest pixel. Specifically, in step 75, a pixel in the candidate set is selected. In step 76, the encoder 14 determines whether the intensity of that pixel is greater than a predetermined threshold away from the intensity of the newest pixel. This predetermined threshold is determined by experimentation and depends, in part, on the intensity range of the pixels in the frames. If the intensity of the selected pixel is greater than the predetermined threshold away from the intensity of the newest pixel, that pixel is removed from the candidate set in step 77. If all the pixels in the candidate set are checked in step 78 (and either left in the candidate set by a no response to the query in step 76 or removed from the candidate set in step 77 due to a yes response to the query in step 76,), processing advances to step 79. Otherwise, a new pixel from the candidate set is selected in step 75 for comparison with the newest pixel in step 76.

In step 79, the average intensity of the pixels remaining in the candidate set is calculated. This average intensity could be a weighted average based on, as one example, the position of the pixel in the frame. Then, in step 80, the average intensity is stored as the current pixel intensity value in the constructed reference frame created from the new image. That is, the average intensity value is stored associated with the pixel position of the pixel selected from the new image that was used to develop the candidate set. In step 82, the encoder 14 queries whether or not all of the pixels in the new image have been reviewed. If they have, processing ends. If not, the next pixel in the new image is selected in step 66. Processing in steps 70 to 80 then repeats for the next pixel so that a candidate set for that pixel is selected and an average intensity value is assigned.

A fifth method of creating a constructed reference frame involves using a scoring methodology to score each block or macroblock within a frame and then computing an overall score for the entire frame. This score can be used to pick which existing frame is used to construct the reference frame (i.e., what offset value, measured in time, is provided between the current frame and the frame that is used to build the constructed reference frame). Several scoring criterion can be used. For example, scoring criteria can include the ratio of error in intra-prediction vs. inter-prediction. In this case, the higher the ratio, the greater the time offset that can be used and the higher the boost that can be applied. Another criterion is the motion vector. The less motion, the greater the time offset and boost can be. Another criterion is zoom in vs. zoom out and still another is the rate of decay in prediction quality.

Next discussed are further details with respect to the selection of constructed reference frames and the update interval and bit-rate boost that should be applied.

In one particularly preferred embodiment of the invention, the use, frequency and quality of constructed reference frames is determined by use of a two pass encoding mechanism. Certain other embodiments might be implemented in one pass encoders and might use different metrics.

In the first pass, information is gathered about the characteristics of the video clip, that is, the series of source frames or images. Each macroblock is encoded in one of two ways, a simple DC predicted intra mode or an inter mode that uses a motion vector and that refers to the previous frame reconstruction buffer.

The reconstructed error score is noted for both encoding methods, and a record is kept of the cumulative score for the frame for the intra mode and for the best mode of either the intra or motion compensated inter mode. Usually the best mode is the inter coding mode. Accordingly, in the following description the cumulative best score will be referred to as the frame's inter error score although the inter coding mode is not necessarily the best mode for each frame.

A record is also kept of the percentage of macroblocks where the best mode for encoding is inter rather than intra, the percentage of the inter coded macroblocks where a zero (null) motion vector is selected and summary information regarding the motion vectors used.

The percentage of the inter coded macroblocks where a zero (null) motion vector is selected indicates how much of the image is static.

The summary information regarding the motion vectors used comprises the number of macroblocks for which a non zero vector is used and a sum value and sum of absolute values for each of the motion vector components (x, y). From these, an average motion vector for the frame (if there are some positive values and some negative values then they may cancel out) and an average motion vector magnitude for the frame can be calculated.

One of the uses for the information gathered in the first pass is to decide whether or how frequently to encode constructed reference frames and also how many bits to spend on them, which comprises the second pass of the encoding mechanism. The constructed frames are encoded at a somewhat higher than average quality (that is, a higher level of boost) in certain embodiments.

The benefit gained by encoding a "boosted" constructed reference frame is dependent in large part on the quality of the prediction from one frame to another within a short sequence of frames. As described above briefly with respect to one embodiment of constructing such a reference frame, a measure used to establish this can be the intra/inter ratio. The intra/inter ratio is the ratio of the summed intra error score for the frame (as measured in the first pass) divided by the cumulative inter (or best) error score for the frame. A large intra/inter ratio (IIRatio) indicates that the use of inter coding gives a very large benefit, which in turn suggests that the frame is well predicted by the preceding frame.

For a sequence of frames to which a constructed reference frame may be relevant, up to a defined maximum interval (Max_interval), a boost score is calculated as described below and as shown with reference to FIG. 7. Initially, a start frame N is selected in step 84. Then, for each frame A from N to N+Max_interval, a number of steps are performed. That is, in step 86, current frame A is first set to start frame N, and current frame A is incremented as discussed hereinafter. As shown in step 88, once the number of current frame A is greater than N+Max_interval number of frames, processing ends. As long as the number of current frame A does not exceed N+Max_interval number of frames, processing continues to step 90.

In step 90, the variable ThisFrameDecayRate is set equal to the variable Nextframe % InterCoded. The variable ThisFrameDecayRate represents the decay rate of frame A. The variable Nextframe % InterCoded is the record described above that is kept for the next frame of the percentage of macroblocks where the best mode for encoding is inter rather than intra coding. Where the Nextframe % InterCoded number is low, this indicates that a lot of blocks in the next frame were poorly predicted by the current frame (and hence ended up being intra coded).

After step 90, processing by the encoder 14 advances to step 92, where a variable DistanceFactor is set. DistanceFactor as calculated in step 92 generally indicates the desirability of boost for the frame and the relative amount of boost that should be performed. Essentially, it is a multiplier to be used to work out BoostScore as described in additional detail hereinafter. The larger the amount of motion, the smaller the value of DistanceFactor because high motion makes it desirable to minimize or eliminate boost. Similarly, if low motion is indicated in the frame, it is reflected by a higher value of DistanceFactor because a higher level of boost is desirable. In step 92, DistanceFactor is set equal to the variable ThisFrameAverageMotionVectorLength divided by, in this case, 300.0. This divisor is based, in part, on the number of pixel units in which the variable ThisFrameAverageMotionVectorLength is specified. In this case, that variable is specified in ⅛ pixel units. The variable ThisFrameAverageMotionVectorLength is the average motion vector for the current frame that is calculated from the summary information regarding the motion vectors described above. The divisor 300 here represents an average motion vector of about 300/8 pixels and was determined by experimentation. This is a high level of movement that indicates that it is undesirable to apply boost to the frame. The divisor, as mentioned, is based in part on the number of pixel units in which the variable ThisFrameAverageMotionVectorLength is specified. It can also be based on the size of the frame. For example, HD would likely require a higher divisor so that proper boost is applied.

In next step 94, the variable DistanceFactor is compared to the number 1.0. If DistanceFactor is less than or equal to 1.0, DistanceFactor is set to 1.0−DistanceFactor in step 96. Otherwise, DistanceFactor is set to zero in step 98. Regardless of the setting of DistanceFactor, processing advances to step 100, where the encoder 14 compares DistanceFactor to the variable ThisFrameDecayRate. If DistanceFactor is less than ThisFrameDecayRate in step 100, processing advances to step 102, where the variable ThisFrameDecayRate takes on the value DistanceFactor. Then, processing advances to step 104. If DistanceFactor is not less than ThisFrameDecayRate in step 100, processing advances directly to step 104.

In step 104, the variable DecayFactor is set equal to the previous value for DecayFactor multiplied by the variable ThisFrameDecayRate. DecayFactor is a value that starts at 1.0 and diminishes with each frame according to the % of the blocks in the next frame that were inter coded in the first pass (as indicated by variable ThisFrameDecayRate). As mentioned previously, where the Nextframe % InterCoded number is low, this indicates that a lot of blocks in the next frame were poorly predicted by the current frame (and hence ended up being intra coded). Therefore, once a macroblock has been intra coded once in a sequence, it is assumed that for that macroblock, the predictive link between frames at opposite ends of the sequence has been broken. DecayFactor provides a relatively crude metric as to how well this predictive link is maintained.

In one embodiment, DecayFactor may also be reduced if the level of motion in the current frame (as measured in the first pass) was high. As mentioned above, ThisFrameAverageMotionVectorLength is specified in ⅛ pixel units in this example. As with a high level of intra coding in a frame, the assumption is that very fast motion (large motion vectors) will reduce the quality of the predictive link between the two ends of the sequence.

After step 104, processing advances to step 106. In step 106, the variable BoostScore is updated to the sum of the previous BoostScore and the result of the multiplication of IIRatio, a MultiplierValue, DecayFactor and a ZoomFactor. The IIRatio and DecayFactor have been discussed previously. MultiplierValue provides a coarse mechanism that can be used by the encoder 14 to adjust boost levels for a particular video clip or application type. ZoomFactor is a value based on the number of motion vectors in the current frame that point outwards versus the number that point inwards. When zooming out, more boost is desirable. When zooming in, less boost is desirable. One way of determining the value of ZoomFactor is to set a counter that increments for each outwardly directed vector and decrements for each inwardly directed vector. When divided by the number of vectors, a value between −1 and +1 results. The scale is then shifted to between 0 and +2, so that the value of ZoomFactor is between 0 and +2. The value of ZoomFactor is larger (that is, greater than 1.0 in this example) when there is a zoom out and smaller when there is a zoom in. BoostScore represents the desired boost for the constructed reference frame used for encoding the frames from N to N+Max_interval.

The encoder 14 advances to the next frame in step 108, and the processing loop will either continue until the maximum interval has been reached or, according to one embodiment, until a set of breakout conditions has been met. The use of breakout conditions allows the encoder 14 to select shorter intervals between constructed reference frame updates where appropriate.

One embodiment using breakout conditions is described with reference to FIG. 8. The steps of FIG. 8 that check for the existence of any breakout conditions are preformed periodically at predetermined intervals in the method shown in FIG. 7. The steps can be performed at a predetermined time interval or can be performed at a particular predetermined time in the processing of FIG. 7, such as at the time the frame is incremented in step 108.

Figure 7:
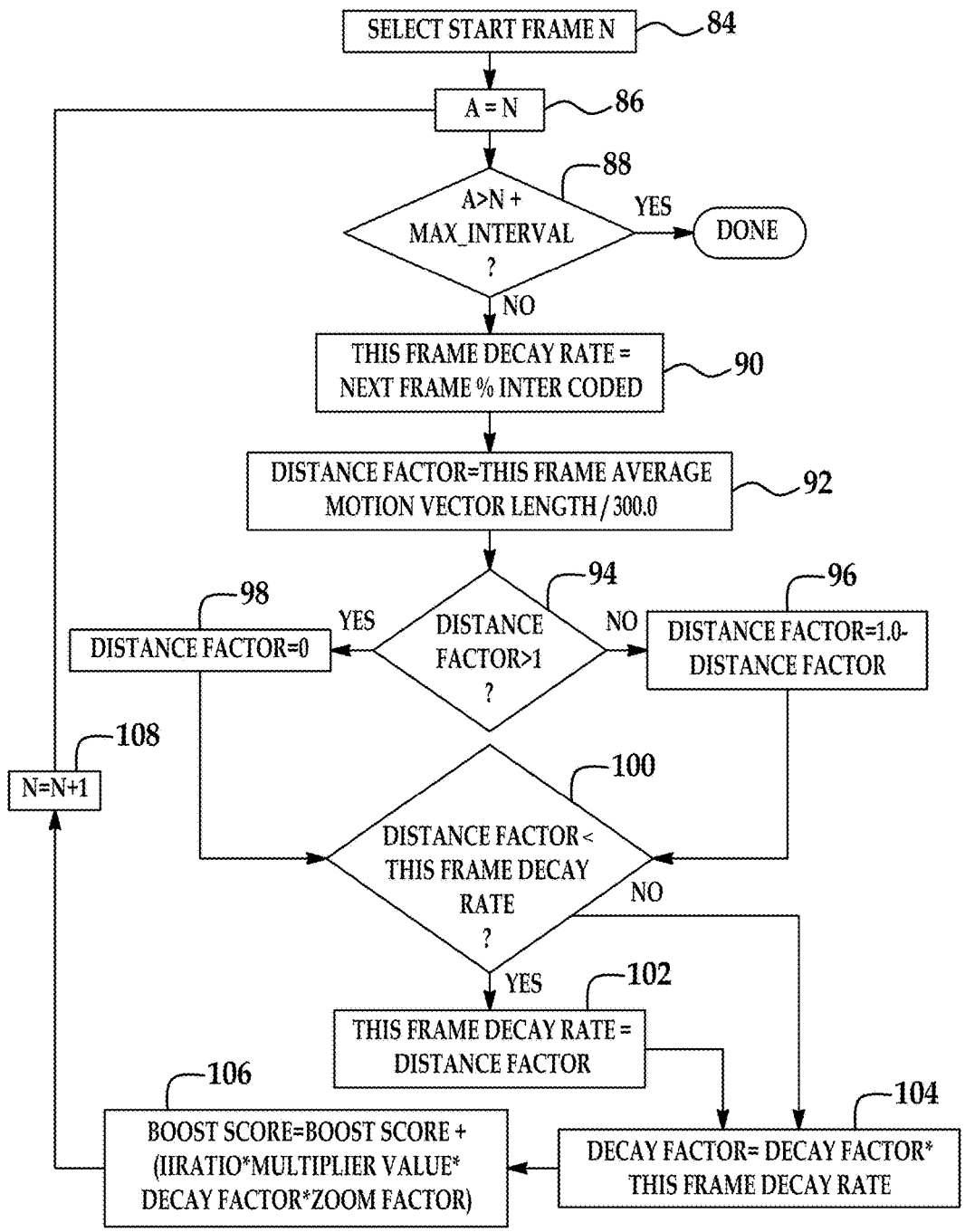
FIG. 7 is a flow chart illustrating an exemplary method of calculating a boost score for a constructed reference frame.
Figure 8:
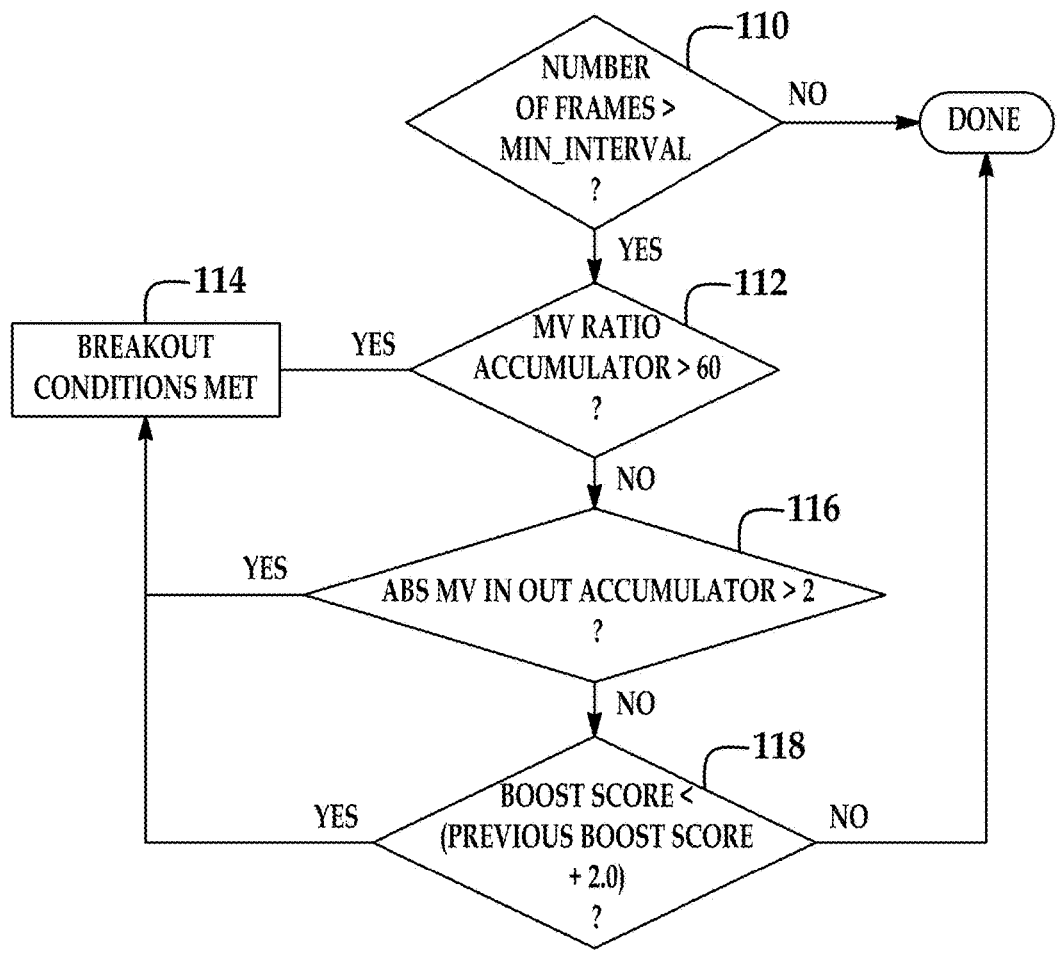
FIG. 8 is a flow chart loop illustrating an example of processing of breakout conditions according to the exemplary method shown in FIG. 7.

In FIG. 8, the number of frames is first compared to the variable Min_interval in step 110. The number of frames is the current frame value A as described with respect to FIG. 7. The variable Min_interval is a pre-defined minimum number of frames between successive constructed reference frames. If the number of frames is not above this minimum, the encoder 14 cannot breakout, that is, the encoder 14 cannot select a shorter interval for the next constructed reference frame.

If the number of frames is greater than the value of Min_interval, the remaining breakout conditions are checked. Only one of the conditions needs to be met in order to indicate that breakout conditions are met and breakout should occur, that is, that processing in FIG. 7 should end at the current frame A, shortening the interval for the use of the constructed reference frame over the Max_interval number of frames. By example, Max_interval is 30 frames, and Min_interval is 4 frames. The lower the frame rate, the lower the value of Max_interval should be. Although these steps are shown in a particular order, the actual order of analysis is not relevant.

First, in step 112, the value of variable MvRatioAccumulator is checked. MvRatioAccumulator is a value that is determined using information gathered in the first pass about the characteristics of the motion. MvRatioAccumulator accumulates the result of dividing the average absolute motion vector by the average motion vector for each frame and is essentially a measure of the randomness of the movement in the frame. A large value indicates that the positive and negative vectors in the frame have cancelled each other out, as may be the case in a zoom, for example, where vectors on opposite sides of the image may be pointing in opposite directions. A value approaching 1.0 indicates that all the vectors are pointing broadly in the same direction (as occurs in, for example, a pan). In such a case, a new constructed reference frame is not needed.

If the variable MvRatioAccumulator is greater than 60 in step 112, then the breakout conditions are met in step 114. The value of 60 indicates, in this case, the desirability of having a constructed reference frame produced more often. The value of 60 is by example only, and other values can be used based on characteristics of the source frames such as discussed previously (e.g., size of frames and motion vector length).

If the variable MvRatioAccumulator is not greater than 60 in step 112, then analysis of the remaining breakout conditions advances to step 116, where the value of variable AbsMvInOutAccumulator is checked. AbsMvInOutAccumulator is also a value that is determined using information gathered in the first pass about the characteristics of the motion. More specifically, AbsMvInOutAccumulator indicates the balance of vectors pointing away from the center of the image compared to those pointing towards the center of the image and can be calculated in a similar manner to that described with respect to ZoomFactor. This helps distinguish zoom in conditions from zoom out conditions. In step 116, if the value of variable AbsMvInOutAccumulator is greater than 2, the breakout conditions are met in step 114 such that a new constructed reference frame appears desirable. Otherwise, processing advances to check the final breakout condition in step 118. The value 2 is a threshold determined by experimentation and would vary based on characteristics such as the size of the frames and the motion vector length.

In step 118, BoostScore is compared to the previous BoostScore (PreviousBoostScore). If BoostScore is less than PreviousBoostScore+2.0, a situation has occurred where the rate of increase in the boost score from one frame to the next has decreased below a threshold amount. Accordingly, when BoostScore is less than PreviousBoostScore+2.0 in step 118, the breakout conditions are met in step 114 such that a new constructed reference frame appears desirable. Otherwise, all of the breakout conditions have been checked, and processing for breakout conditions ends. Processing in FIG. 7 resumes.

The value 2.0 in step 118 is a threshold used as an indicator that the quality of prediction between the two ends of the sequence has dropped below a minimum acceptable level such that the spacing between the previous constructed reference frame and the subsequent constructed reference frame as determined in FIG. 7 is too large (i.e., too many frames are being encoded using the previous constructed reference frame). The value 2.0 corresponds to the calculation IIRatio*MultiplierValue*DecayFactor*ZoomFactor described in step 106 of FIG. 7 for the current frame and is determined based on experimentation given the range of variables for that calculation.

The algorithm described with respect to FIGS. 7 and 8 will give a suggested update interval between Min_interval to Max_interval frames. It also provides a suggested bit allocation (or bit boost) for the current update. In the examples discussed herein, the suggested bit allocation is 100*BoostScore/16, which is a normalization into a percentage bit allocation. In other words, BoostScore is a relative value for each of the constructed reference frames that is used to allocate the available bits, which are dependent on memory, the number of constructed reference frames, etc.

However, regardless of the results determined in FIGS. 7 and 8, there remain situations it may not be appropriate to update the constructed reference frame as indicated.

In one embodiment, the following criteria are used to determine if an updated constructed reference frame is desirable. If the BoostScore for the sequence is above a threshold amount (indicating a good correlation of the constructed reference frame with the sequence of frames), the average value of DecayFactor for the frames in the sequence was above a threshold value (indicating good prediction over the sequence), and no rapid zoom was detected (especially conditions of zooming in where image data is leaving the image), then the update is desirable. These criteria are preferably checked after each loop where a new constructed reference frame is indicated in response to the analysis in FIG. 8, when performed. If any one of these conditions is not met, the processing for the next constructed reference frame continues. More specifically, the current frame is encoded using the previous constructed reference frame, and the calculations of FIG. 7 restart at the next frame and continue up to Max_interval unless the conditions of FIG. 8 are again met to indicate the desirability of a new constructed reference frame at an earlier interval.

Note that algorithms defined above for determining the appropriateness, interval and boost for constructed reference frames, or a similar one, could also be used for defining the optimal number of B frames between successive P frames, and the distribution of bits between P and B frames, in encoders/decoders that support bidirectional prediction.

The constructed reference frame need not be displayed to the end user (that is, need not be included in the final decoded video output) and need not correspond to an actual image. As such, the size and configuration of the constructed reference frame are arbitrary and can be determined programmatically by the encoder 14 to optimize the quality of the encoding.

One benefit is that the decode need not re-perform the computations used to create the constructed reference frame. Thus, a computationally expensive processes can be used on by the encoder 14 to derive the constructed reference frame, but this process need not be performed by the decoder 21, thus permitting faster, lighter and more efficient decoding.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method of decoding an encoded video stream, the method comprising:
generating, by a processor in response to instructions stored on a non-transitory computer readable medium, a decoded video for presentation to a user, wherein generating the decoded video includes:
receiving an encoded video stream;
generating a decoded constructed reference frame by decoding an encoded constructed reference frame from the encoded video stream, wherein the decoded constructed reference fame is a non-display frame;
generating a decoded current frame by decoding an encoded current frame from the encoded video stream using the decoded constructed reference frame as a reference frame; and
including the decoded current frame in the decoded video such that the decoded constructed reference frame is omitted from the decoded video; and
outputting the decoded video.

2. The method of claim 1, wherein a value of a dimension of the decoded constructed reference frame differs from a value of the dimension of the decoded current frame.

3. The method of claim 1, wherein decoding the encoded constructed reference frame includes decoding the encoded constructed reference frame at a first encoding quality level and decoding the encoded current frame includes decoding the encoded current frame at a second encoding quality level different from the first encoding quality level.

4. The method of claim 1, wherein the encoded video stream includes a sequence of encoded video frames, including the encoded constructed reference frame and the encoded current frame, generated by:
generating a constructed reference frame based on an input frame from a sequence of input video frames;
generating the encoded constructed reference frame by encoding the constructed reference frame;
including the encoded constructed reference frame in the encoded video stream;
generating the encoded current frame by encoding the input frame using the constructed reference frame as a reference frame; and
including the encoded current frame in the encoded video stream subsequent to the encoded constructed reference frame.

5. The method of claim 4, wherein encoding the constructed reference frame includes encoding the constructed reference frame at a first encoding quality level and encoding the input frame includes encoding the input frame at a second encoding quality level lower than the first encoding quality level.

6. The method of claim 4, wherein generating the constructed reference frame includes:
identifying an adjacent frame, wherein the adjacent frame is an input frame temporally adjacent to the input frame from the sequence of input video frames;
generating a denoised constructed reference frame by temporally filtering the constructed reference frame based on the adjacent frame; and
using the denoised constructed reference frame as the constructed reference frame.

7. The method of claim 4, wherein generating the constructed reference frame includes:
identifying an input block from the input frame;
identifying a first candidate matching input block from a first other input frame from the sequence of input video frames;
identifying a second candidate matching input block from a second other input frame from the sequence of input video frames;
on a condition that an error metric for the first candidate matching input block is within an error metric for the second candidate matching input block, including the first candidate matching input block in the constructed reference frame; and
on a condition that the error metric for the first candidate matching input block exceeds the error metric for the second candidate matching input block, including the second candidate matching input block in the constructed reference frame.

8. The method of claim 4, wherein generating the constructed reference frame includes:
identifying a background portion of the input frame, such that a difference between a foreground portion of the input frame and the input frame is the background portion of the input frame; and
including the background portion of the input frame in the constructed reference frame, such that the foreground portion of the input frame is omitted from the constructed reference frame.

9. The method of claim 8, further comprising:
generating a second decoded constructed reference frame by decoding a second encoded constructed reference frame from the encoded video stream, wherein the sequence of encoded video frames includes the second encoded constructed reference frame generated by including the foreground portion of the input frame in the second constructed reference frame, such that the background portion of the input frame is omitted from the second constructed reference frame, and encoding the second constructed reference frame.

10. The method of claim 4, wherein generating the constructed reference frame includes:

determining a respective score for each input frame from the sequence of input frames; and identifying the input frame from the sequence of input frames having the optimal score.

11. The method of claim 10, determining the respective score for each input frame includes determining the respective score for each input frame based on an error ratio between inter-prediction and intra-prediction, motion vector magnitude, zoom, or prediction quality decay rate, for each block of the respective input frame.

12. The method of claim 1, wherein generating the decoded video includes:

decoding, from the encoded bitstream, an information indicating that displaying the decoded video omits displaying the decoded constructed reference frame.

13. A non-transitory computer-readable storage medium, comprising executable instructions that, when executed by a processor, facilitate performance of operations, comprising:

generating a decoded video for presentation to a user, wherein generating the decoded video includes:
receiving an encoded video stream;
generating a decoded constructed reference frame by decoding an encoded constructed reference frame from the encoded video stream, wherein the decoded constructed reference fame is a non-display frame;
generating a decoded current frame by decoding an encoded current frame from the encoded video stream using the decoded constructed reference frame as a reference frame; and
including the decoded current frame in the decoded video such that the decoded constructed reference frame is omitted from the decoded video; and
outputting the decoded video.

14. The non-transitory computer-readable storage medium of claim 13, wherein a value of a dimension of the decoded constructed reference frame differs from a value of the dimension of the decoded current frame.

15. The non-transitory computer-readable storage medium of claim 13, wherein decoding the encoded constructed reference frame includes decoding the encoded constructed reference frame at a first encoding quality level and decoding the encoded current frame includes decoding the encoded current frame at a second encoding quality level different from the first encoding quality level.

16. The non-transitory computer-readable storage medium of claim 13, wherein the encoded video stream includes a sequence of encoded video frames, including the encoded constructed reference frame and the encoded current frame, generated by:

generating a constructed reference frame based on an input frame from a sequence of input video frames;
generating the encoded constructed reference frame by encoding the constructed reference frame;
including the encoded constructed reference frame in the encoded video stream;
generating the encoded current frame by encoding the input frame using the constructed reference frame as a reference frame; and
including the encoded current frame in the encoded video stream subsequent to the encoded constructed reference frame.

17. The non-transitory computer-readable storage medium of claim 16, wherein encoding the constructed reference frame includes encoding the constructed reference frame at a first encoding quality level and encoding the input frame includes encoding the input frame at a second encoding quality level lower than the first encoding quality level.

18. The non-transitory computer-readable storage medium of claim 16, wherein generating the constructed reference frame includes:

identifying an adjacent frame, wherein the adjacent frame is an input frame temporally adjacent to the input frame from the sequence of input video frames;
generating a denoised constructed reference frame by temporally filtering the constructed reference frame based on the adjacent frame; and
using the denoised constructed reference frame as the constructed reference frame.

19. The non-transitory computer-readable storage medium of claim 16, wherein generating the constructed reference frame includes:

identifying an input block from the input frame;
identifying a first candidate matching input block from a first other input frame from the sequence of input video frames;
identifying a second candidate matching input block from a second other input frame from the sequence of input video frames;
on a condition that an error metric for the first candidate matching input block is within an error metric for the second candidate matching input block, including the first candidate matching input block in the constructed reference frame; and
on a condition that the error metric for the first candidate matching input block exceeds the error metric for the second candidate matching input block, including the second candidate matching input block in the constructed reference frame.

20. The non-transitory computer-readable storage medium of claim 16, wherein generating the constructed reference frame includes:

identifying a background portion of the input frame, such that a difference between a foreground portion of the input frame and the input frame is the background portion of the input frame; and
including the background portion of the input frame in the constructed reference frame, such that the foreground portion of the input frame is omitted from the constructed reference frame.

21. The non-transitory computer-readable storage medium of claim 20, further comprising:

generating a second decoded constructed reference frame by decoding a second encoded constructed reference frame from the encoded video stream, wherein the sequence of encoded video frames includes the second encoded constructed reference frame generated by including the foreground portion of the input frame in the second constructed reference frame, such that the background portion of the input frame is omitted from the second constructed reference frame, and encoding the second constructed reference frame.

22. The non-transitory computer-readable storage medium of claim 16, wherein generating the constructed reference frame includes:

determining a respective score for each input frame from the sequence of input frames; and
identifying the input frame from the sequence of input frames having the optimal score.

23. The non-transitory computer-readable storage medium of claim 22, determining the respective score for each input frame includes determining the respective score for each input frame based on an error ratio between inter-prediction and intra-prediction, motion vector magnitude, zoom, or prediction quality decay rate, for each block of the respective input frame.

24. The non-transitory computer-readable storage medium of claim 13, wherein generating the decoded video includes:
   decoding, from the encoded bitstream, an information indicating that displaying the decoded video omits displaying the decoded constructed reference frame.

* * * * *